United States Patent
Batchelor et al.

(10) Patent No.: US 7,685,325 B2
(45) Date of Patent: Mar. 23, 2010

(54) SYNCHRONOUS BUS CONTROLLER SYSTEM

(75) Inventors: Gary William Batchelor, Tucson, AZ (US); Enrique Garcia, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 97 days.

(21) Appl. No.: 11/969,351

(22) Filed: Jan. 4, 2008

(65) Prior Publication Data

US 2009/0177812 A1    Jul. 9, 2009

(51) Int. Cl.
*G06F 13/00* (2006.01)

(52) U.S. Cl. .................. 710/8; 710/104; 710/305

(58) Field of Classification Search ........ 710/8–10, 710/104

See application file for complete search history.

(56) References Cited

U.S. PATENT DOCUMENTS

| | | | |
|---|---|---|---|
| 5,319,571 A | 6/1994 | Langer et al. | |
| 5,551,053 A | 8/1996 | Nadolski et al. | |
| 5,781,549 A | 7/1998 | Dai | |
| 5,951,661 A | 9/1999 | Tavallaei et al. | |
| 5,982,652 A | 11/1999 | Simonelli et al. | |
| 5,990,638 A * | 11/1999 | Aoyama et al. | 318/85 |
| 6,041,414 A | 3/2000 | Kikuchi | |
| 6,438,647 B1 | 8/2002 | Nielson et al. | |
| 6,629,247 B1 | 9/2003 | Hall et al. | |
| 6,810,442 B1 | 10/2004 | Lin et al. | |
| 6,954,704 B2 | 10/2005 | Minami et al. | |
| 7,165,005 B2 | 1/2007 | Steger et al. | |

\* cited by examiner

*Primary Examiner*—Glenn A Auve
(74) *Attorney, Agent, or Firm*—Kunzler & McKenzie (57) ABSTRACT

A system for generating bus signals for a plurality of remote stations. Bus data packets are comprised of a plurality of data blocks. Each data block is directed to a remote station. The position of each data block in the data packet identifies the remote station to which the data block is directed. Each of the remote stations receives each data packet substantially synchronously. The remote stations decode the data packets to determine the type of data packet and identify the content of the data packet directed to it. Each remote station loads the corresponding content from the data packet. Each of the remote stations can then generate output signals based on the data packet content substantially synchronously with the other remote stations.

20 Claims, 4 Drawing Sheets

SYNCHRONOUS BUS CONTROLLER SYSTEM

BACKGROUND OF THE INVENTION

1. Field of the Invention

The present invention relates to data storage systems and more particularly, to a method, apparatus and program storage device for providing a synchronous bus controller system.

2. Description of Related Art

In distributed computing systems a host computer typically controls and monitors rudimentary functions in other components of the distributed computing system, such as expansion enclosures or remote stations, using a minimal number of signals. Basic functions typically controlled by the host include indicators, switches, sensors, and generating simple waveforms. One conventional approach is to have independent direct connections between a host and remote stations. However, in high density modular systems like rack systems and blade systems, providing multiple direct connections between a host component and other components can create excessively complex cabling and wiring requirements.

To simplify wiring and cabling requirements hosts in modular systems often control components in the system using standard serial interfaces, such as a two wire I2C bus managed directly by the host. In such a system the host typically periodically individually addresses or polls devices on remote stations over a shared I2C bus. Various I2C devices are available for specific functions such as IO expanders which allow a host to generically manipulate and or sample signals on the remote stations.

A problem with conventional systems which use a bus like an I2C bus is the inability to tightly synchronize the assertion/de-assertion of signals via IO expanders on the various remote stations. To send a signal to a specific remote station, bus protocols like I2C specify the address of the target remote station and send signal packets including such addresses over the bus. A target remote station identifies a signal packet as being directed to it based on the address. The target remote station reads the content of signal packets addressed to it. To send a plurality of different signal packets to associated target remote stations, a host may generate and send such different signal packets individually to each of the corresponding target remote stations. Generating and sending such signal packets individually is one factor which can result in uncertainty in the timing of such signal packets reaching the different target remote stations. In addition, before a host completes generating and sending a group of such signal packets, the host process may be interrupted and the host may execute other instructions before resuming generating and sending the signal packets to the target remote stations. Such interrupts are another illustrative factor which can result in uncertainties in the timing of signal packets reaching different remote stations. These timing limitations of conventional systems can also result in such systems being incapable of generating sufficiently accurate waveforms at the remote stations, for example symmetric square waves with sufficiently accurately defined pulse width and duty cycle.

It can be seen that there is a need to provide an improved bus controller system with better control of signal timing.

SUMMARY OF THE INVENTION

To overcome the limitations in the prior art described above, and to overcome other limitations that will become apparent upon reading the present specification, the present invention provides a method, apparatus and program storage device for generating bus signals for a plurality of remote stations. Bus data packets are comprised of a plurality of data blocks. Each data block is directed to a remote station. The position of each data block in the data packet identifies the remote station to which the data block is directed. Each of the remote stations receives each data packet substantially synchronously. The remote stations decode the data packets to determine the type of data packet and identify the content of the data packet directed to it. Each remote station loads the corresponding content from the data packet. Each of the remote stations can then generate output signals based on the data packet content substantially synchronously with the other remote stations.

In a further embodiment, a microcontroller sends a bus controller a signal which defines an operating mode of the bus controller which can include initiating transmitting data packets over the bus. The bus controller can continue to transmit data packets over the bus until receiving a signal from the microcontroller to change its operating mode, such as to stop sending the data packets, or to initiate a configuration process.

In a further embodiment, a bus controller system according to the present invention can monitor the status of the remote stations by receiving and evaluating status data packets from the remote stations.

These and various other advantages and features of novelty which characterize the invention are pointed out with particularity in the claims annexed hereto and form a part hereof. However, for a better understanding of the invention and its advantages reference should be made to the drawings which form a further part hereof, and to accompanying descriptive matter, in which there are illustrated and described specific examples of preferred embodiments of the invention.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description of preferred embodiments of the present invention, reference is made to the accompanying drawings, which form a part hereof, and in which is shown by way of illustration specific embodiments in which the invention may be practiced. It is to be understood that other embodiments may be utilized as structural changes may be made without departing from the scope of the present invention.

The present invention provides a method, apparatus and program storage device for a synchronous bus communication system. The present invention allows for synchronous output signals to be generated by remote stations without intervention of a host microcontroller.

Figure 1:
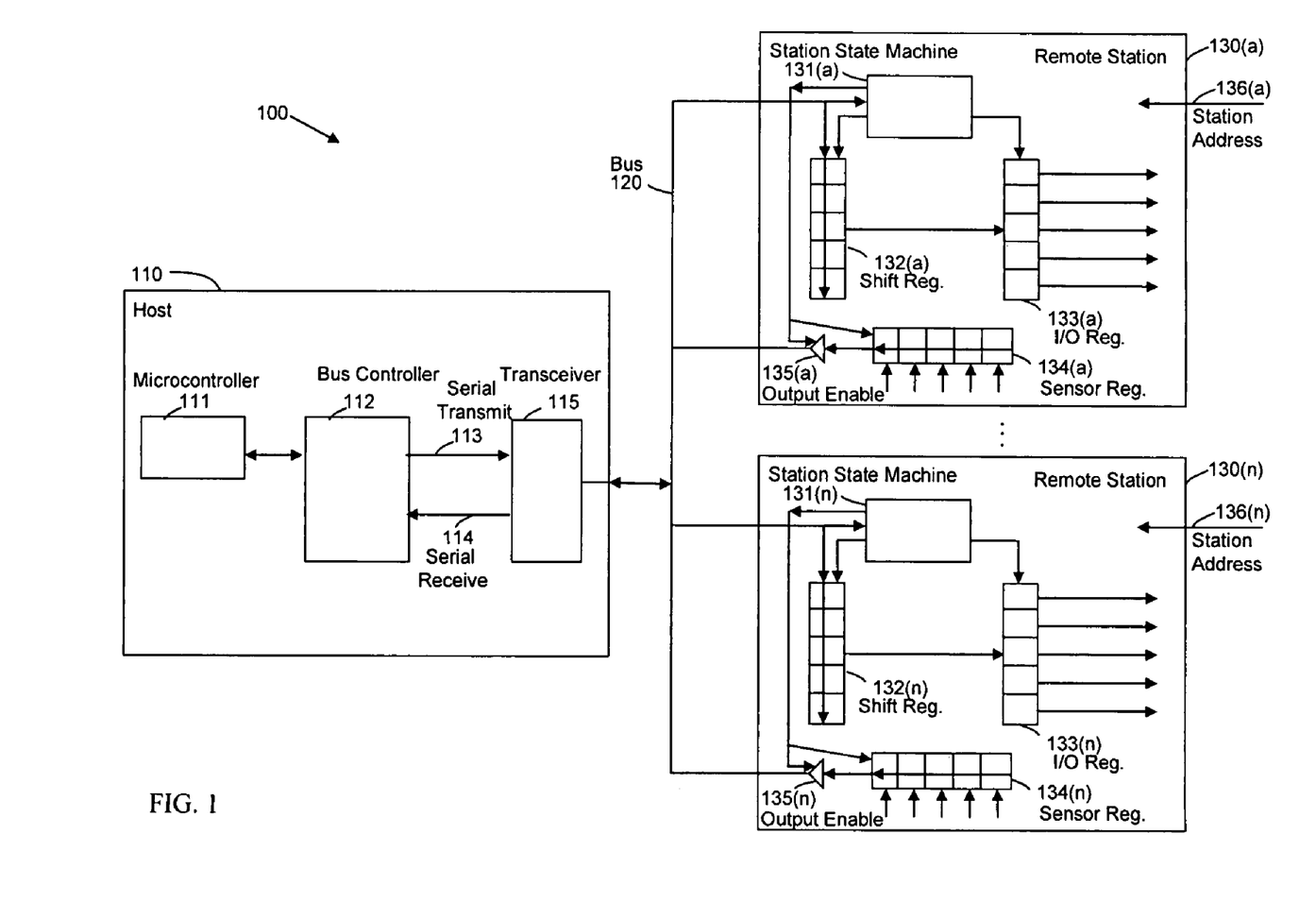
FIG. 1 illustrates a synchronous bus communication system according to one embodiment of the present invention.

FIG. 1 illustrates a synchronous bus communication system 100 according to one embodiment of the present invention. In FIG. 1, a host 110 is comprised of microcontroller 111, a bus controller 112, and a transceiver 115. Microcontroller 111 is coupled to bus controller 112. Microcontroller 111 may be coupled to bus controller 112 via an internal bus. Bus controller 112 is coupled to transceiver 115 via a serial transmit line 113 and a serial receive line 114. In one embodiment bus controller 112 is comprised of a field programmable gate array.

Synchronous bus communication system 100 may include a plurality of remote stations coupled to host 110 via bus 120. These remote stations are illustrated by remote stations 130(a)-130(n), where "n" is any integer. Remote station 130(a) is comprised of station state machine 131(a), shift register 132(a), I/O register 133(a), sensor register 134(a) and output enabler 135(a). Bus 120 is coupled to station state machines 131(a)-(n) and shift registers 132(a)-(n). Referring to remote station 130(a), station state machine 131(a) is coupled via control lines to shift register 132(a) and I/O register 133(a). The outputs of shift register 132(a) are coupled in parallel to the inputs of I/O register 133(a). In one embodiment station address 136(a) is used to define an address for the remote station. Sensor register 134(a) inputs are coupled to remote station 130(a) inputs to receive data, from for example sensors. The sensor register 134(a) output is coupled via output enable 135 to bus 120. Remote stations 130(b)-(n) are similarly configured.

An illustrative implementation of synchronous bus communication system 100 is in a modular storage server system, such as a rack system, blade system or other form factor modular system. In a rack storage server implementation, host 110 may comprise a controller drawer in the rack, or a controller card in a multiprocessor controller. Remote stations 130 may be comprised of complex programmable logic devices ("CPLD") in other drawers in the rack storage system, such as disk drive drawers, power supply drawers or server drawers. Bus 120 may be comprised of an interconnect between the different drawers in the rack system. For example bus 120 may comprise a RS-485 differential half duplex serial bus. A differential half duplex serial bus approach provides a further advantage of avoiding ground referencing issues associated with single-ended interfaces like I2C which can occur when remote stations are widely separated.

The following is a description of the high level operation of an embodiment of synchronous bus communication system 100 in an illustrative implementation in a storage server system. In operation, microcontroller 111 controls the operation of the primary functions of host 110. In a storage server system, microcontroller 111 controls the reading, writing and management of data stored in the storage server system. Bus controller 112 generates signals to be transmitted over bus 120 and controls communication over bus 120. Bus controller 112 frees microcontroller 111 from having to control communication over bus 120 and thereby avoids the adverse impact such control requirements would otherwise have on the performance of microcontroller 111 on the primary microcontroller functions such as controlling data read and write operations in the storage server system. Transceiver 115 transmits control signal and data packets to remote stations 130(a)-(n). Each of the remote stations 130(a)-(n) receives the data packets, decodes the data packets to identify the data directed to it, and performs an action based on the data packet such as generating an output signal. The synchronous output signals of the remote stations can be used for a wide range of functions including for example, providing other components communication signals, timing signals, alarm signals, or displaying visual indicators such as lights and service indicators.

Figure 2:
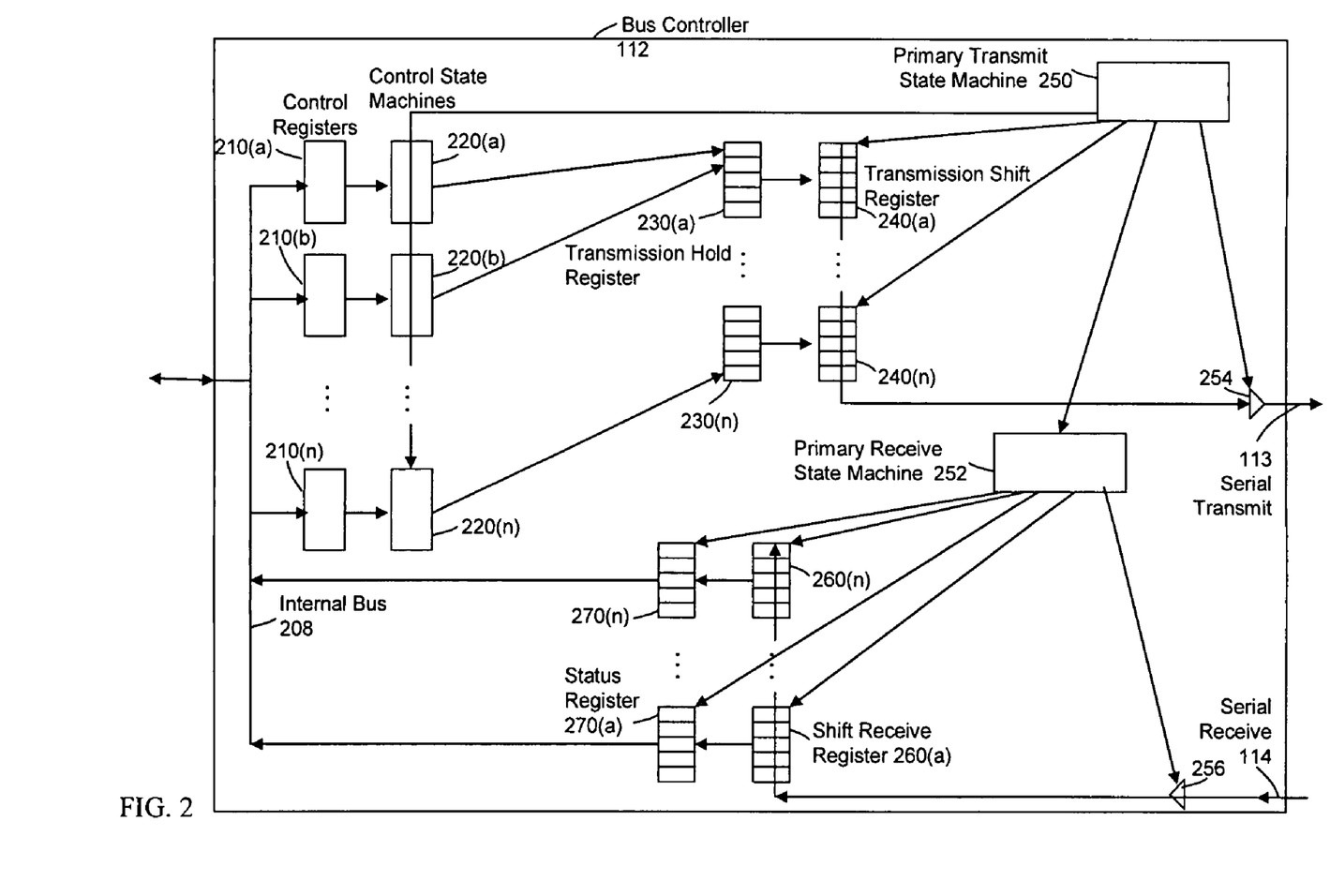
FIG. 2 illustrates a bus controller according to one embodiment of the present invention.

FIG. 2 illustrates components of bus controller 112 according to one embodiment of the present invention. A bus controller 112 input is coupled to internal bus 208. Internal bus 208 is also coupled to control registers 210(a)-(n). Control registers 210(a)-(n) are coupled to control state machines 220(a)-(n). Control registers 210(a)-(n) can be memory mapped control registers. Microcontroller 111 can write values into control registers 210(a)-(n). Each bit position in the control register or combination of bits can be used to set an output signal mode. For example, setting one bit position in a control register may set the corresponding LED(s) in a rack drawer to flash. In one embodiment bus controller 112 may include a control register 210 and a control state machine 220, coupled thereto, for each signal or bit on each remote station 130(a)-(n). In other embodiments the number (n) may be a different number for each component. For example, the number of control registers 210 may be different from the number of control state machines 220 which may further be different from the number of remote stations 130. Control state machines 220(a)-(n) are coupled to and controlled by primary transmit state machine 250. Primary transmit state machine 250 manages the low level serialization and overall management of bus 120 (shown in FIG. 1).

Control state machines 220(a)-(n) can be coupled in serial or in parallel to primary transmit state machine 250. Control state machines 220(a)-(n) are also each coupled to a bit in one of the transmission hold registers 230(a)-(n). Control state machines 220(a)-(n) each calculate when to update the corresponding transmission hold register(s) 230(a)-(n) based on the operation mode of the control state machines. A dedicated control state machine can be used for each I/O signal or bit on each remote station. Alternatively a single control state machine can be used for multiple I/O signals or bits depending in part on the nature of the remote station output signals to be provided.

Each control state machine can be independently programmed to generate any desired sequence or waveform for its corresponding remote station IO signal. Control state machines 220(a)-(n) are managed by control registers 210(a)-(n). Control state machines 220(a)-(n) automatically implement a defined function based on the control register bit settings they receive. Thus microcontroller 111 may only send an initial control signal, microcontroller 111 does not need to manage the timing or otherwise be involved in generating the ongoing signals sent by host 110 onto bus 120, nor the signals generated by the remote stations 130(a)-(n).

Transmission hold registers 230(a)-(n) are also coupled to the inputs of transmission shift registers 240(a)-(n). Transmission shift registers 240(a)-(n) are each coupled to and controlled by primary transmit state machine 250. Each shift transmission register 240 is further serially coupled to the next shift transmission register. The output of shift transmission register 240(n) is coupled to serial transmit line 113. The content of the bits in the transmission shift registers 240 can thus be serially shifted through the chain of transmission shift registers to the serial transmit line 113. Primary transmit state machine 250 controls via output enable 254 the timing of when data bits are transferred through serial transmit 113 to bus 120.

Bus controller serial receive input 114 is coupled to shift receive register 260(a) via receive input enable 256. Each of the shift receive registers 260(a)-260(n) are further serially coupled to the next shift receive register. Such that data from serial receive input 114 can be shifted serially through the first bit in shift receive register 260(a) through ultimately to the last bit of shift receive register 260(n). Shift receive registers 260(a)-260(n) are coupled in parallel to the inputs of status registers 270(a)-270(n). The output of each of the status registers 270(a)-270(n) is coupled to internal bus 208.

Figure 3:
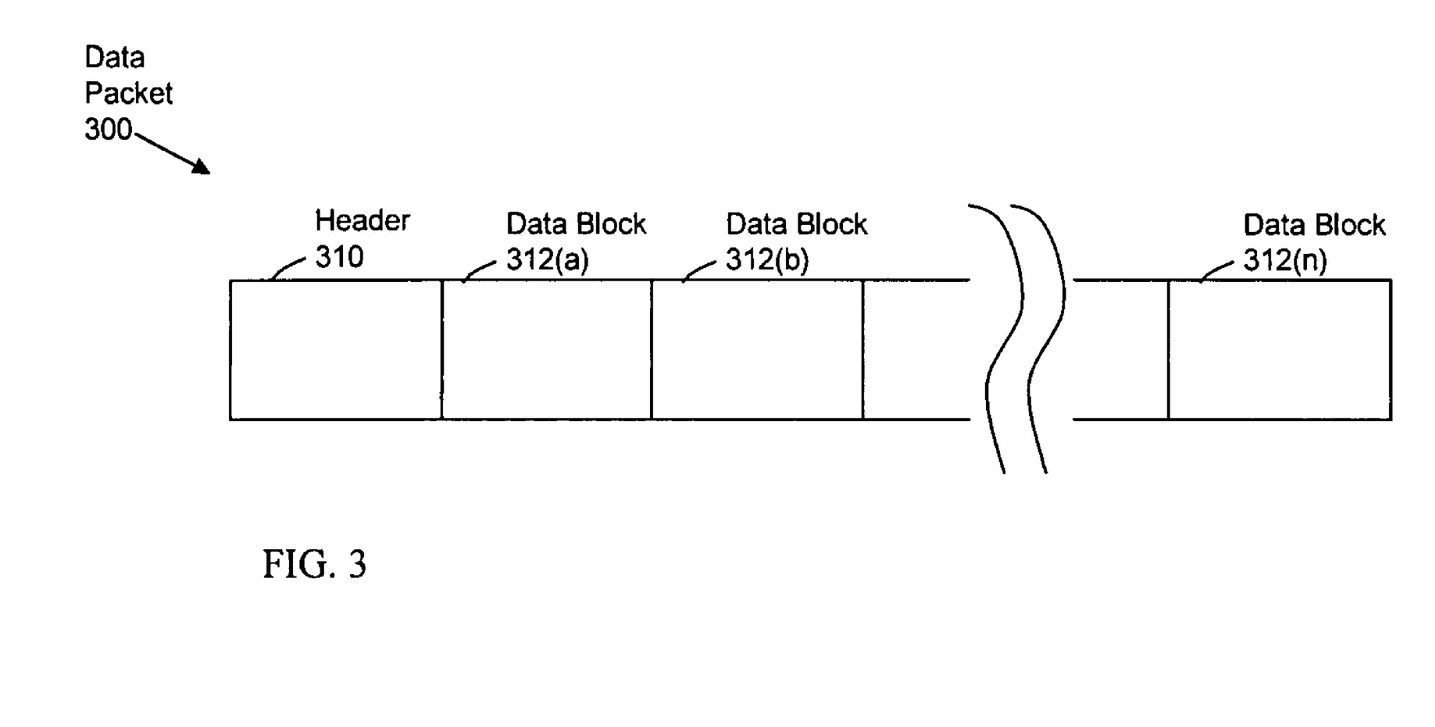
FIG. 3 illustrates a data packet according to one embodiment of the present invention.

FIG. 3 illustrates a data packet 300 according to one embodiment of the present invention. Data packets 300 are transmitted by host 100 (shown in FIG. 1) onto bus 120 to remote stations 130(a)-(n). Data packet 300 includes a plurality of segments including header 310, and data blocks 312(a)-312(n). Header 310 comprises control data for the bus control system, and may define a data packet as being a particular type of data packet, for example a configuration data packet which may change one or more parameters in the operation of the station state machines. For example, header 310 can include control bits to indicate: the number of active remote stations in the system, the number of data blocks in the data packet, other station state machine control information and the type of data block content. For example one type of data packet may contain one or more data blocks which provide station state machine configuration, control, and or operation mode update information. Bus controller 112 can define an address for each remote station via station address lines 136(a)-136(n). Configuration data packets can use the remote station addresses to direct unique configuration data to each remote station. In one embodiment the data packets of the present invention can be sent over an existing general purpose data bus. In such an embodiment the header could be used to distinguish data packets for the present invention from other protocol signal packets on the bus.

In a further embodiment, bus 120 can be used to initially configure the addresses of the remote stations and thereby avoid the need for station address lines 136(a)-136(n). In one such embodiment, configuration data packets can include a control bit to define an initial configuration process which is used when one or more remote stations are added to the system. When a new component is added to the system, for example adding another storage blade to an enclosure, an initial handshake process can be used for bus controller 112 to expressly identify each additional remote station and assign an address to each such additional remote station. A verification process can be used to verify each additional remote station has been assigned an address.

Each data block 312(a)-312(n) can contain control and or I/O bits for one or more remote stations. The term I/O bit refers to a type of control bit which in a preferred embodiment will be loaded into an I/O register 133(a)-(n). For example, an illustrative system may have ten rack components each with a remote station, and each remote station may have five I/O bits associated with it in each data packet. In such an embodiment data block 312(a) can contain the five I/O bits for remote station 130(a) shown in FIG. 1, and data block 312(n) would be the tenth data block and can contain the five I/O bits associated with the tenth remote station. Data packets can also include parity and CRC bits to validate the data content.

Figure 4:
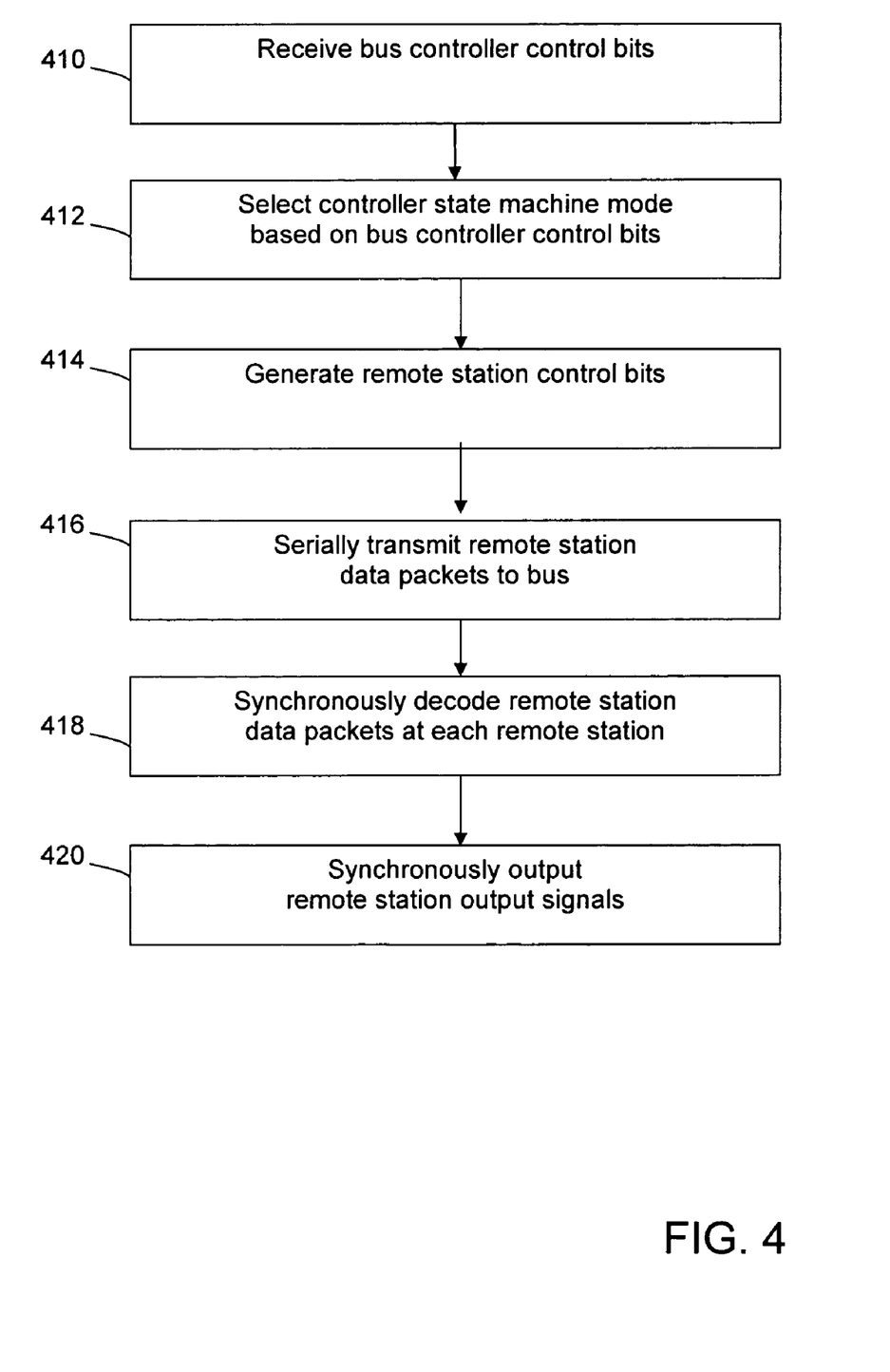
FIG. 4 illustrates a flow chart of a synchronous bus communication method according to one embodiment of the present invention.

FIG. 4 illustrates a flow chart of a synchronous bus communication method according to one embodiment of the present invention. A method illustrated in FIG. 4 allows for synchronous output signals to be generated by remote stations without intervention of a host microcontroller. For illustrative purposes the FIG. 4 flow chart is described with reference to the synchronous bus communication system shown in FIG. 1 and the bus controller shown in FIG. 2. The flow chart is further described with reference to an implementation of the present invention which drives a synchronous display of LED's on a plurality of rack components. For example, one or more LED's or lights may be included on each drawer in the rack computer system. Synchronously flashing LED's on two or more of the rack drawers can be used to indicate the rack drawers are operating as part of the same subsystem, or to indicate two or more racks which may be in a related failure more.

At 410, bus controller control bits are received. Microcontroller 111 can transmit control bits to bus controller 112. In the bus controller 112 embodiment of FIG. 2, the control bits are stored in control registers 210(a)-(n). At 412, the control state machines in the bus controller are set to an operation mode based on the bus controller control bits. For example, control state machines 220(a)-(n) can be set to an operation mode to define one of a plurality of output patterns for the rack component LED's to display.

At 414 remote station control bits are generated. Each control state machine 220(a)-(n) calculates how long to assert and de-assert its associated control bit(s) based on the operation mode it is in. For example to flash an LED on for one second then off for one second, the control state machines can each set a bit in the transmission hold registers 230(a)-(n) to turn on each corresponding LED, then after a second de-assert these bits in the transmission hold registers 230(a)-(n). This pattern could then be repeated until microcontroller 111 sends a control signal to change the control state machines operation mode. Control state machines 220(a)-(n) can provide control bits to transmission hold registers 230(a)-(n) at an update cycle frequency defined by a timing signal from primary transmit state machine 250.

Each LED in each drawer can be represented by one bit in the transmission hold registers 230(a)-(n). Transmission hold registers 230(a)-(n) can comprise one bit position for each control state machine 220(a)-(n). The contents of transmission hold registers 230(a)-(n) can then be loaded into transmission shift registers 240(a)-(n) based on a timing signal control signal from primary transmit state machine 250.

At 416 remote station data packets are serially transferred to a bus. In one embodiment, data packets may comprise the combined content of transmission shift registers 240(a)-(n), and include control bits for all of the remote stations. The data packets are serially transferred by transmission shift registers 240(a)-(n) to serial transmit line 113 onto bus 120 based on a timing signal from primary transmit state machine 250. Primary transmit state machine 250 would load the content of transmission hold registers 230(a)-(n) to transmission shift registers 240(a)-(n), and transmit the content to serial transmit line 113 at frequent and fixed intervals. Primary transmit state machine 250 can cause the transmission shift registers 240(a)-240(n) to serially transmit all of their contents to the remote stations via bus 120 in one operation.

At 418 the data packets are received by remote stations 130(a)-(n) and are synchronously decoded at each remote station. Each remote station can select the I/O bits which are directed to it based on the position of the I/O bits in the data packets. The I/O bits in the data packets are loaded into shift registers 132(a)-(n) in each of the remote stations. Station state machines 131(a)-(n) in each remote station shift the I/O bits through shift registers 132(a)-(n) as needed to position the block of I/O bits directed to the remote station in the respective bit positions in the shift registers 132(a)-(n). For example, for remote station 130(a) station state machine 131(a) could shift the shift register 132(a) so as to shift out the data packet header 310 (shown in FIG. 3), and leave the data block 312(a) I/O bits in shift register 132(a). A second remote station would shift out the bits from header 310 and data block 312(a) and leave the data block 312(b) I/O bits in its shift register. At the end of the shift operations, station state machines 131(a)-(n) sends timing signals to load the content of shift registers 132(a)-(n) into I/O registers 133(a)-(n). All of the remote stations' 130(a)-(n) I/O registers can thereby be loaded synchronously.

In an embodiment where the remote stations' output signals control visual indicators, such as LED's, the contents of shift registers 132(a)-(n) may be updated with data from a new data packet every millisecond. During each millisecond update cycle the new data from shift registers 132(a)-(n) is transferred to I/O registers 133(a)-(n), even if the value of the control bits have not changed. This update cycle occurs in the remote stations synchronously, such that the remote station output signals can be synchronous.

In one embodiment each remote station may have a fixed number of associated I/O bits, corresponding to a fixed position in the data packets, and the number of remote stations may be predetermined. In other embodiments one or more of these parameters may be dynamically defined. For example, data packet header 310 may comprise a bit to indicate the data packet has configuration information to configure the remote stations to define what data block position corresponds to which of the remote stations, and how many bits in each data block each remote station should load. The configuration information in header 310 can also allow the bus controller to autonomically re-configure itself to accommodate additional remote stations, or in the event one or more remote stations are removed, or fail, the number of data blocks in the data packets can be reduced.

At 420 the remote stations synchronously output signals. The remote station output signals are generated based on each remote station's I/O bits provided by data blocks 312(a)-(n) (shown in FIG. 3). The remote station output signals are transferred from I/O registers 133(a)-(n) based on timing control signals from station state machine 131(a). The method of FIG. 4 enables the remote stations to be controlled to generate a wide range of output signals. The method of FIG. 4 further provides for highly synchronized output signals from the remote stations. In addition one or more remote stations can be missing or non-operational, and the remaining remote stations can continue to operate properly.

In a further embodiment of the present invention in addition to receiving control signals from a host, remote stations 130(a)-(n) (shown in FIG. 1) can transfer data to host 110 without requiring intervention of microcontroller 111. Referring to remote station 130(a), sensor register 134(a) can receive signals from a sensor or other status data source. For example sensor register 134(a) may receive status data from a sensor to detect temperature, loss of power sensor, a component error message, or other environmental condition or event. In one embodiment in a bus cycle, after data packet content has been loaded into shift registers 132(a)-(n), station state machines 131(a)-(n) may send timing signals to have sensor register 134(a)-(n) transfer the status data over bus 120 to host 110. More specifically station state machine 131(a) may first serially clock out the content of sensor register 134(a) to bus 120 via output enable 135(a), after a defined number of clock cycles remote station 130(b) then sends the content of its sensor register onto the bus as a status data segment, and this process can be repeated until the last remote station has transferred the content of its sensor register on the bus. The combination of status data segments from one or more of the remote stations forms a status data segment. Bus controller 112 receives the status data packets and decodes them to determine which status data segments correspond to which remote station based on the location of each status data segment in the status data packet.

In a further embodiment, rather than transmitting sensor data from the remote stations in each bus cycle, bus controller 112 can define when the remote stations provide sensor data based on control bits provided in the header 310 of data packet 300. Similar to the data packets received by the remote stations, the remote station data to be sent to host 110 can be defined based on a fixed predetermined number of remote stations to be providing such data, or the number of remote stations providing data to host 110 can be dynamically determined using control bits in header 310.

Referring to FIG. 2, bus controller 112 receives remote station data via serial receive line 114. Remote station data is loaded into shift receive registers 260(a)-(n) based on timing control signals from primary receive state machine 252. Remote station data is transferred in parallel from shift receive registers 260(a)-(n) to status registers 270(a)-(n). The remote station data in status registers 270(a)-(n) can then be accessed by microcontroller 111 as memory mapped registers via internal bus 208.

Another illustrative embodiment of the present invention is for synchronous bus control system 100 to generate error warning signals. The error warning signals may comprise a wave form which is continuously generated by the synchronous bus control system 100 until an applicable error is detected, such as for example an error which indicates failure of a device, a cable has been unplugged, or that power has been lost. Upon such an error being detected the toggling error warning signal is de-asserted which indicates the failure. The present invention allows the timing of an error warning signal such as a square wave, including pulse width and duty cycle, to be precisely controlled, which in turn allows devices to quickly to detect whether the error warning signal has been de-asserted thereby indicating an error has occurred. The present invention allows for individual control bit positions to generate independent error warning signals for each rack system drawer and for each component in the rack system drawers as necessary. The present invention thus avoids the need for separate wires to be used to connect to each such drawer and component in the drawers to provide such independent warning signals.

While the present invention has been described in terms of preferred embodiments for achieving this invention's objectives, it will be appreciated by those skilled in the art that variations may be accomplished in view of these teachings without deviating from the spirit or scope of the present invention. The invention can take the form of a hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

What is claimed is:

1. A method of generating bus signals for a plurality of remote stations comprising:
   transmitting a plurality of data packets to a bus, wherein the data packets are comprised of a plurality of data blocks, each of the plurality of the data blocks correspond to a remote station, and wherein a position of the data blocks in the data packet identifies the remote station to which the data block is directed;
   substantially synchronously receiving a first data packet from the bus at a plurality of remote stations;
   identifying in a first remote station of the plurality of remote stations a first data block in the first data packet based on a position of the first data block in the first data packet, and loading content of the first data block; and
   identifying in a second remote station a second data block in the first data packet based on a position of the second data block in the first data packet, and loading content of the second data block substantially synchronously with the first remote station loading the content of the first data block.

2. The method of claim 1 further comprising:
   in response to receiving at a bus controller at least one control bit from a microcontroller, generating in the bus controller a plurality of data packets, and serially transmitting the data packets to the bus; and
   outputting by the first and second remote stations substantially synchronous output signals.

3. The method of claim 2 further comprising:
   defining an operating mode of at least one control state machine in the bus controller based on receiving at least one control bit from the microcontroller;
   defining at least one bit by the at least one control state machine to be included in at least one of the data blocks of at least one data packet;
   generating at least one data packet by at least combining a plurality of data blocks; and
   transmitting a plurality of data packets serially over the data bus to the plurality of remote stations.

4. The method of claim 1 further comprising:
   identifying a header in a second data packet;
   loading content of the second data packet header into a second station state machine in the second remote station;
   identifying the second data packet as one of a plurality of data packet types based on the second data packet header; and
   identifying one of a plurality of data block positions in the second data packet as being a position of the second data block based on bit values in the second data packet header.

5. The method of claim 4 further comprising:
   identifying a third data packet as a configuration data packet based on control bits in a header in the third data packet;
   modifying an operating mode of the second station state machine in the second remote station based on the configuration data packet, to change a data block size in the data packets, wherein the data block size comprises the number of bits the second remote station loads as a data block.

6. The method of claim 5 further comprising:
   receiving status data at a plurality of the remote stations;
   transmitting a status data segment from each of the plurality of remote stations to a bus controller over a bus, wherein each remote station sends a status data segment in a defined order after a defined period;
   receiving at a bus controller a status data packet comprising status data segments from each of the plurality of remote stations; and
   decoding the status data packet to determine a remote station associated with each of a plurality of status data segments in the status data packet based on positions of the status data segments in the status data packet.

7. The method of claim 3 further comprising:
   generating a first output signal waveform at the first remote station, wherein a value of the first output signal waveform in a clock cycle is generated based on a value of a bit in a first bit position in a first data block position of a data packet;
   generating a second output signal waveform at the first remote station, wherein a value of the second output signal waveform in a clock cycle is based on a value of a bit in a second bit position in the first data block position of the first data packet;
   evaluating at the first remote station the first output signal waveform to determine an error event status which is applicable to a first device;
   initiating an error response if a first attribute of the first output signal is not detected after a first time period;
   evaluating at the first remote station the second output signal waveform to determine an error event status which is applicable to a second device; and
   initiating an error response if a second attribute of the second output signal is not detected after a second time period.

8. A bus controller comprising:
   an input configured to be coupled to a microcontroller;
   an output configured to be coupled to a bus; and
   a bus control logic module, wherein the bus control logic module is configured to perform operations comprising:
      in response to receiving at least one control bit from a microcontroller, generating a first plurality of data packets, wherein the data packets comprise a plurality of data blocks, and each data block in the data packet is assigned to a remote station based on a position of the data block in the data packet; and
      transmitting the first plurality of data packets to the bus, wherein each data packet is configured to be received by a plurality of remote stations substantially synchronously.

9. The bus controller of claim 8 wherein the operations further comprise:
   defining an operating mode of a control state machine in the bus controller based on receiving at least one control bit from the microcontroller;

defining at least one bit by the at least one control state machine to be included in at least one data block of a data packet;

generating a data packet by at least combining a plurality of data blocks; and transmitting a plurality of data packets serially to the data bus for a plurality of remote stations.

10. The bus controller of claim 9 wherein the operations further comprise generating a header in a second data packet, wherein the header defines the second data packet as being one of a plurality of data packet types, and wherein the header further defines a second data block position in the second data packet as being directed to a second remote station.

11. The bus controller of claim 9 wherein the operations further comprise generating a configuration data packet comprising:

control bits in a header to identify the configuration data packet as a configuration data packet; and configuration data, wherein the configuration data defines an operating mode for the second remote station, the configuration data further defines a data block size in the data packets, and wherein the data block size comprises the number of bits for the second remote station to load as a data block.

12. The bus controller of claim 8 wherein the operation further comprise:

receiving a status data packet comprising status data segments from each of the plurality of remote stations, wherein each remote station sends a status data segment in a defined order; and decoding the status data packet to determine a remote station associated with each of a plurality of status data segments in the status data packet based on a position of the status data segment in the status data packet.

13. A method of generating bus control signals comprising:

in response to receiving at least one control bit from a microcontroller, generating a first plurality of data packets, wherein the data packets comprise a plurality of data blocks, each of the data blocks corresponds to a remote station, and each data block in the data packet is assigned to a remote station based on a position of the data block in the data packet; and transmitting the first plurality of data packets to the bus, wherein each data packet is configured to be received by a plurality of remote stations substantially synchronously.

14. The method of claim 13 further comprising:

defining an operating mode of a control state machine in the bus controller based on receiving at least one control bit from the microcontroller;

defining at least one bit by the at least one control state machine to be included in at least one data block of a data packet;

generating a data packet by at least combining a plurality of data blocks; and transmitting a plurality of data packets serially to the data bus for a plurality of remote stations.

15. The method of claim 14 further comprising generating a header in a second data packet, wherein the header defines the second data packet as being one of a plurality of data packet types, and wherein the header further assigns a second data block position in the second data packet to a second remote station.

16. The method of claim 13 further comprising generating a configuration data packet comprising:

control bits in a header to identify the configuration data packet as a configuration data packet; and configuration data, wherein the configuration data defines an operating mode for the second remote station, the configuration data further defines a data block size in the data packets, and wherein the data block size comprises the number of bits for the second remote station to load as a data block.

17. The method of claim 13 further comprising:

receiving a status data packet comprising status data segments from each of the plurality of remote stations, wherein each remote station sends a status data segment in a defined order; and decoding the status data packet to determine a remote station associated with each of a plurality of status data segments in the status data packet based on a position of the status data segment in the status data packet.

18. The method of claim 17 further comprising:

detecting an additional remote station has been installed in a system; and assigning an address to the additional remote station over the bus.

19. A computer program product tangibly embodying instructions executable by a computer to perform operations for generating control signals on a bus, the operations comprising:

in response to receiving at least one control bit from a microcontroller, generating a first plurality of data packets, wherein the data packets comprise a plurality of data blocks, and each data block in the data packet is assigned to a remote station based on a position of the data block in the data packet; and transmitting the first plurality of data packets to the bus, wherein each data packet is configured to be received by a plurality of remote stations substantially synchronously.

20. The computer program product of claim 19 wherein the operations further comprise generating a header in a second data packet, wherein the header defines the second data packet as being one of a plurality of data packet types, the header further defines a second data block position in the second data packet as being directed to a second remote station, and the header further comprises a protocol identifier.

* * * * *